(12) United States Patent
Lee

(10) Patent No.: US 8,260,105 B2
(45) Date of Patent: Sep. 4, 2012

(54) ENCLOSURE FOR HOUSING SPLICE TRAYS

(75) Inventor: Scott David Lee, Terrigal (AU)

(73) Assignee: ADC GmbH, Berlin (DE)

( * ) Notice: Subject to any disclaimer, the term of this patent is extended or adjusted under 35 U.S.C. 154(b) by 333 days.

(21) Appl. No.: 12/607,653

(22) Filed: Oct. 28, 2009

(65) Prior Publication Data

US 2010/0172621 A1   Jul. 8, 2010

(30) Foreign Application Priority Data

Oct. 28, 2008   (AU) .................................. 2008905554

(51) Int. Cl.
*G02B 6/00* (2006.01)
(52) U.S. Cl. ........................................................ 385/135
(58) Field of Classification Search ........................ None
See application file for complete search history.

(56) References Cited

U.S. PATENT DOCUMENTS

| 7,496,269 B1 | 2/2009 | Lee |
| 7,522,805 B2 | 4/2009 | Smith et al. |
| 2009/0110360 A1* | 4/2009 | Anderson et al. ............. 385/135 |

OTHER PUBLICATIONS

Brochure: ADC Telecommunications. FL1000 Customer Premises Fiber Distribution Products. pp. 1-8. 1998.
Brochure: ADC Telecommunications: Fiber Panel Products Second Edition. pp. 1-111. 1994.
Brochure: ADC Telecommunications: FL2000 Products. pp. 1-48. 1994.

* cited by examiner

*Primary Examiner* — Jerry Rahll
(74) *Attorney, Agent, or Firm* — Merchant & Gould P.C.

(57) ABSTRACT

An enclosure for housing splice trays, including a bracket adapted to couple one or more splice trays to the enclosure, wherein the bracket is adapted to rotate the splice trays about an axis.

16 Claims, 3 Drawing Sheets

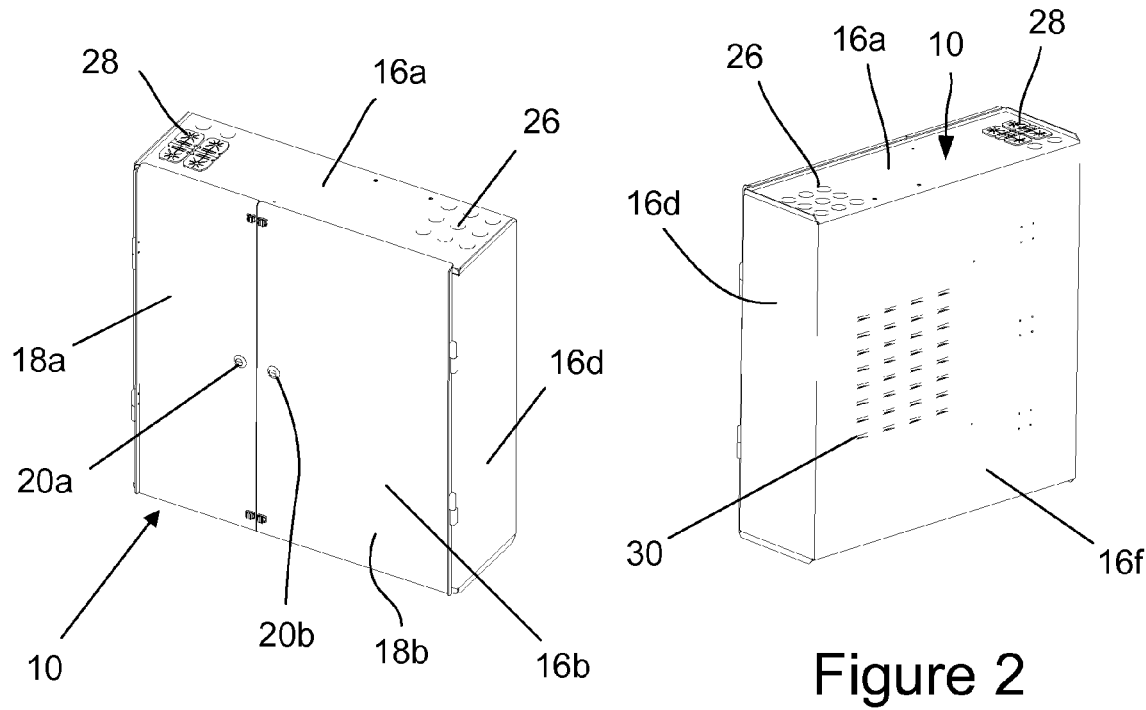
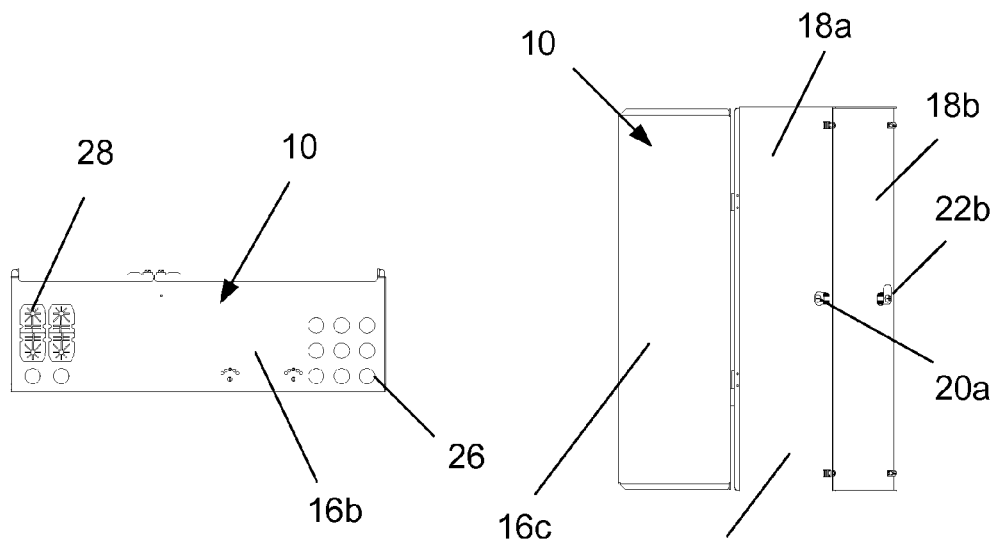

ENCLOSURE FOR HOUSING SPLICE TRAYS

This application claims benefit of Serial No. 2008905554, filed 28 Oct. 2008 in Australia and which application is incorporated herein by reference. To the extent appropriate, a claim of priority is made to the above disclosed application.

FIELD OF THE INVENTION

The present invention relates to an enclosure for housing splice trays. For example, the invention relates to an enclosure for the safe containment of cables such as optical fibers.

BACKGROUND OF THE INVENTION

The process of binding together two ends of an optical fiber is known as splicing, resulting in a "splice" being created between the two fibers. Splices are particularly susceptible to damage from mechanical disturbances such as shock, stress, dynamic loading and the like. Modern optical fiber networks can contain cables comprising hundreds of optical fibers and a correspondingly large number of individual splices each of which needs to be protected against the aforementioned mechanical disturbances.

Splice trays have previously been developed for the containment of optical fibers and cables. Splice trays may be useful in protecting optical fibers and cables against undesirable mechanical disturbances. However, handling difficulties may arise during the placement of new cables into splice trays, for example, where multiple splice trays are collocated.

In an office, for example, multiple splice trays are generally arranged in a single enclosure, such as a cabinet, for ordinance and protection. Arranging the splice trays in such a way can make it difficult to properly access any one particular splice tray if new connections, or maintenance of existing connections, is desired.

It is generally desirable to overcome or ameliorate one or more of the above described difficulties of known splice tray enclosures, or to at least provide a useful alternative.

SUMMARY OF THE INVENTION

In accordance with one aspect of the present invention, there is provided an enclosure for housing splice trays, including a bracket adapted to couple one or more splice trays to the enclosure, wherein the bracket is adapted to rotate the splice trays about an axis.

Preferably, the bracket extends at least partially between opposed sections of the enclosure.

Preferably, the bracket is coupled between said opposed sections of the enclosure by lugs extending axially from opposite ends of the bracket.

Preferably, the bracket further includes an indexing means for securing the bracket in one of a plurality of discrete positions through which the bracket can be rotated.

Preferably, the indexing means includes a locking lug offset from one of said lugs, the locking lug being shaped to be received in any one of a plurality of recesses formed in one of said opposed sections of the enclosure over which it passes during rotation of the bracket.

Preferably, the bracket is free to move longitudinally along its axis of rotation to enable the locking lug to be disengaged from a corresponding one of said recesses rotated to a new position.

Preferably, splice trays are adapted to be coupled to a frame of the bracket.

Preferably, the splice trays are adapted to be coupled to opposite sides of the frame.

In accordance with another aspect of the invention, there is provided a splice tray for use in the enclosure claimed in any one of the preceding claims, wherein the splice tray is adapted to be coupled between opposed sections of the enclosure by a bracket, wherein the bracket is pivotally mounted so as to rotate the splice about an axis.

BRIEF DESCRIPTION OF THE DRAWINGS

Preferred embodiments of the invention are hereafter described, by way of non-limiting example only, with reference to the accompanying drawings, in which:

FIG. 1 is a front perspective view of an enclosure;

FIG. 2 is a rear perspective view of the enclosure shown in FIG. 1;

FIG. 3 is a bottom view of the enclosure shown in FIG. 1;

FIG. 4 is a side view of the enclosure shown in FIG. 1 arranged in another condition of use;

DETAILED DESCRIPTION OF PREFERRED EMBODIMENTS OF THE INVENTION

Figure 5:
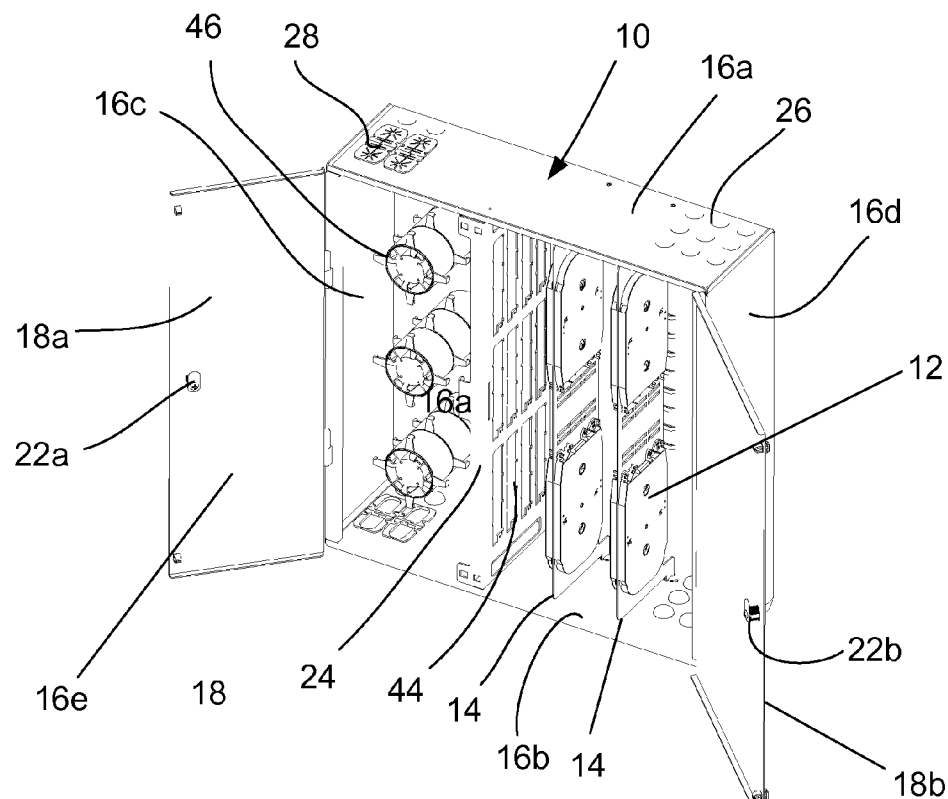
FIG. 5 is a front perspective view of the enclosure shown in FIG. 4.
Figure 6:
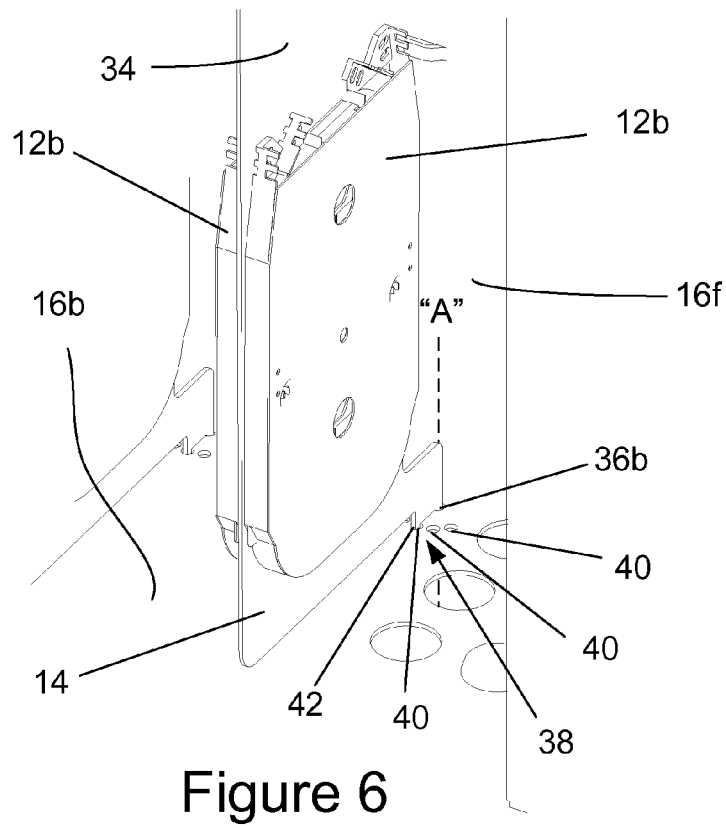
FIG. 6 is an enlarged view of splice trays mounted within the enclosure shown in FIG. 5.
Figure 7:
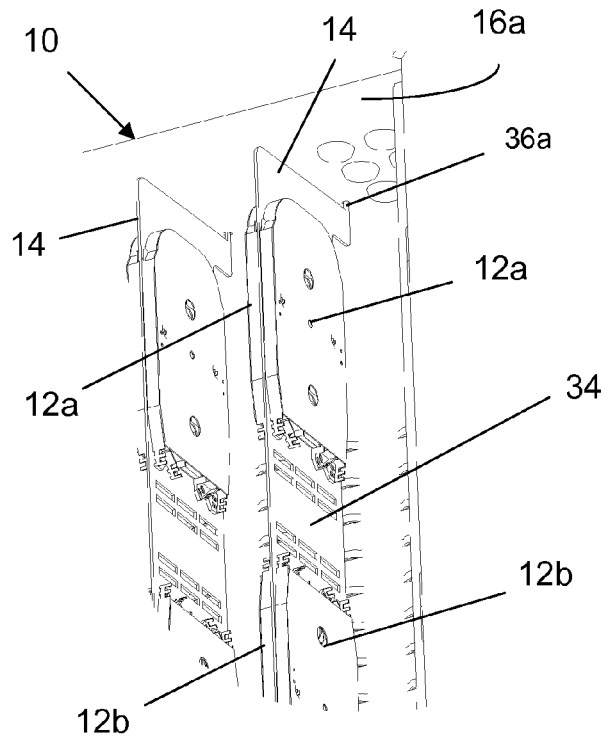
FIG. 7 is an enlarged view of splice trays mounted within the enclosure shown in FIG. 5.
Figure 8:
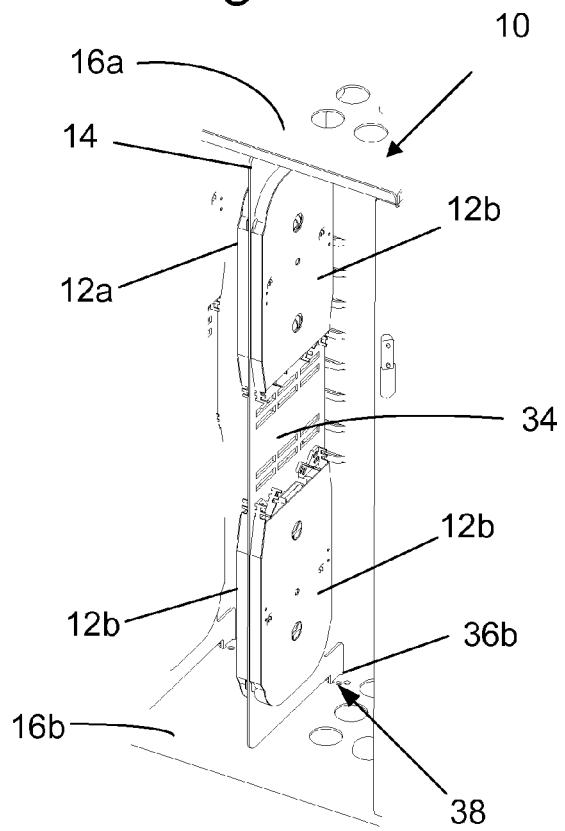
FIG. 8 is an enlarged view of splice trays mounted within the enclosure shown in FIG. 5.

The enclosure 10 shown in FIGS. 1 to 5 is used to house splice trays 12. The enclosure 10 includes a bracket 14 adapted to couple one or more splice trays 12 to the enclosure 10. The bracket 14 is adapted to rotate the splice trays 12 about an axis "A" in the manner shown in FIG. 6.

The enclosure 10 is a generally rectangular cabinet defined by top 16a, bottom 16b, left side 16c, right side 16d, front 16e and back panels 16f. The front side 16e of the enclosure 10 includes two hinged doors 18a, 18b that open outwardly in the manner shown in FIG. 5 so as to lay open the contents of the enclosure 10. The hinged doors 18a, 18b each include a handle 20a, 20b having a locking device 22a, 22b operable with a central post 24 inside the enclosure 10. The locking devices 22a, 22b securely close the doors 18a, 18b of the enclosure 10. The locking devices 22a, 22b are preferably operable to open and close the doors 18a, 18b with use of a key.

Enclosure 10 includes a plurality of openings 26 for cable entry and a plurality of openings 28 for cable exit. Openings 26 and 28 may be provided on either the top 16a or bottom 16b of the enclosure 10 or both. Openings 26 and 28 may be partially formed to allow a user to 'punch out' the required openings, or alternatively, openings 26 and 28 may be covered with removable inserts to allow access when desired. The enclosure 10 preferably includes a reduced number of cavities open to the surrounding environment, thereby reducing entry of unwanted contaminants.

Apertures (not shown) may be provided in rear wall 16f to enable enclosure 10 to be fixedly attached to a wall surface, for example. Apertures 30 are provided inside enclosure 10 to allow fitment of cable management clips (not shown) to secure slack fiber cable inside enclosure 10.

The bracket 14 includes a generally rectangular, planar, frame 34 that extends between the top and bottom 16a, 16b sides of the enclosure 10. The bracket 14 includes two splice trays 12a, 12b connected to each side of the frame 34.

The bracket 14 is coupled between the opposed top and bottom 16a, 16b sections of the enclosure 10 by lugs 36a, 36b extending axially from opposite top and bottom ends of the bracket 14. The lugs 36a, 36b are seated in corresponding recesses or the top and bottom sides 16a, 16b of the enclosure 10. The lugs 36a, 36b are adapted to pivot in the recesses. As such, the bracket 14 is adapted to rotate the splice trays 12 through a range of movement about the axis "A" defined by the axial lugs 36a, 36b.

The bracket 14 also includes an indexing means 38 for securing the bracket 14 in one of a plurality of discrete positions within the above-mentioned range of movement. The discrete positions are defined by recesses 40 formed in the bottom section 16b of the enclosure 10. The indexing means 38 includes a locking lug 42 offset from the axial lug 36b. The locking lug 42 is shaped to be received in any one of a plurality of recesses 40 formed in the bottom side 16b of the enclosure over which it passes during rotation of the bracket.

The bracket 14 is movable upwards along its vertical axis "A" to allow disengagement of locking lug 42 from recess 40 and rotation of bracket 14 within enclosure 10.

In use, cable (not shown) enters enclosure 10 through openings 26 and is then attached to splice tray 12 where splicing occurs using known splicing techniques. Apertures 30 located on the back side 16f of the enclosure 10 are provided to allow the fitment of cable management clips (not shown) which may be used to secure the cables to the inside of enclosure 10. After splicing, the cable exits the splice tray in the form of splitter output cables that are then connected to connector panel 44 to enable connection to individual devices. Individual cables are wound around cable organisers 46 to arrange outgoing cable, which then exits through cable exit opening 28.

In the embodiment shown, four splice trays 12a, 12b are fastened to the front and back sides of the frame 34 of the bracket 14. Alternatively, any number of splice trays 12 may be fastened to the front and back sides of the frame 34 of the bracket 14.

The enclosure 10 preferably includes multiple brackets 14, each including multiple splice trays 12.

In an alternative embodiment of the invention, the bracket 14 is formed in upper and lower parts coupled to opposite ends of a splice tray.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

List of Parts
10 Enclosure
12, 12a, 12b Splice tray
14 Bracket
16a, 16b Top and bottom sides of the enclosure
16c, 16d Left and right sides of the enclosure
16e, 16f front and back side of the enclosure
18a, 18b Door
20a, 20b Handle
22a, 22b Locking device
24 Central post
26 Inlet aperture
28 Outlet aperture
30 Aperture
34 Frame
36a, 36b Lug
38 Indexing means
40 Recess
42 Locking lug
44 Connector panel
46 Cable organiser

The invention claimed is:

1. An enclosure for housing splice trays, comprising:
   an enclosure body,
   a splice tray, and
   a bracket adapted to couple the splice tray to the enclosure body,
   wherein the bracket is adapted to rotate the splice tray about an axis; and
   wherein a plurality of splice trays are adapted to be coupled to a frame of the bracket.

2. The enclosure claimed in claim 1, wherein the bracket extends at least partially between opposed sections of the enclosure body.

3. The enclosure claimed in claim 2, wherein the bracket is coupled between said opposed sections of the enclosure body by lugs extending axially from opposite ends of the bracket.

4. The enclosure claimed in claim 3, wherein the bracket further includes an indexing means for securing the bracket in one of a plurality of discrete positions through which the bracket can be rotated.

5. The enclosure claimed in claim 4, wherein the indexing means includes a locking lug offset from one of said lugs, the locking lug being shaped to be received in any one of a plurality of recesses formed in one of said opposed sections of the enclosure over which it passes during rotation of the bracket.

6. The enclosure claimed in claim 5, wherein the bracket is free to move longitudinally along its axis of rotation to enable the locking lug to be disengaged from a corresponding one of said recesses and rotated to a new position.

7. The enclosure claimed in claim 1, wherein the bracket is rotatable in a substantially vertical plane.

8. The enclosure claimed in claim 1, wherein the axis of rotation is substantially collinear with an edge of the bracket.

9. The enclosure claimed in claim 1, wherein the bracket extends in opposite directions from opposed ends of the splice tray.

10. The enclosure claimed in claim 1, wherein the splice trays are adapted to be coupled to opposite sides of the frame.

11. An enclosure for housing splice trays, comprising:
    an enclosure body,
    a splice tray, and
    a bracket adapted to couple the splice tray to the enclosure body, wherein the bracket extends at least partially between opposed sections of the enclosure body; wherein the bracket is coupled between said opposed sections of the enclosure body by lugs extending axially from opposite ends of the bracket; wherein the bracket is adapted to rotate the splice tray about an axis; and wherein the bracket further includes an indexing means for securing the bracket in one of a plurality of discrete positions through which the bracket can be rotated.

12. The enclosure claimed in claim 11, wherein the bracket is rotatable in a substantially vertical plane.

13. The enclosure claimed in claim 11, wherein the axis of rotation is substantially collinear with an edge of the bracket.

14. The enclosure claimed in claim 11, wherein the bracket extends in opposite directions from opposed ends of the splice tray.

15. The enclosure claimed in claim 11, wherein the indexing means includes a locking lug offset from one of said lugs, the locking lug being shaped to be received in any one of a plurality of recesses formed in one of said opposed sections of the enclosure over which it passes during rotation of the bracket.

16. The enclosure claimed in claim 15, wherein the bracket is free to move longitudinally along its axis of rotation to enable the locking lug to be disengaged from a corresponding one of said recesses and rotated to a new position.

\* \* \* \* \*